(12) United States Patent
Hendley, IV et al.

(10) Patent No.: US 11,401,281 B1
(45) Date of Patent: Aug. 2, 2022

(54) SYNTHESIS OF COPPER AZIDO-BASED ENERGETIC COMPOUND

(71) Applicant: The United States of America as Represented by the Secretary of the Navy, Indian Head, MD (US)

(72) Inventors: Coit T. Hendley, IV, Lanham, MD (US); Andrew T. Kerr, Alexandria, VA (US); Owen T. O'Sullivan, Alexandria, VA (US)

(73) Assignee: The United States of America as representing by the Secretary of the Navy, Washington, DC (US)

( * ) Notice: Subject to any disclaimer, the term of this patent is extended or adjusted under 35 U.S.C. 154(b) by 3 days.

(21) Appl. No.: 16/974,407

(22) Filed: Jan. 19, 2021

(51) Int. Cl.
*C07F 1/08* (2006.01)

(52) U.S. Cl.
CPC ..................................... *C07F 1/08* (2013.01)

(58) Field of Classification Search
CPC ........................................................ C07F 1/08
See application file for complete search history.

(56) References Cited

U.S. PATENT DOCUMENTS

| | | | |
|---|---|---|---|
| 4,093,623 A * | 6/1978 | Gilligan | C07F 1/005 548/109 |
| 6,096,774 A | 8/2000 | Bottaro et al. | |
| 6,255,512 B1 | 7/2001 | Bottaro et al. | |
| 6,552,051 B2 | 4/2003 | Bottaro et al. | |
| 7,375,221 B1 | 5/2008 | Fronabarger et al. | |
| 7,399,841 B1 | 7/2008 | Koppes et al. | |
| 8,895,736 B1 | 11/2014 | Stern et al. | |
| 9,278,984 B2 * | 3/2016 | Klapötke | C07F 1/08 |
| 9,902,748 B2 * | 2/2018 | Chavez | C07F 15/045 |
| 10,174,064 B2 * | 1/2019 | Chavez | C07F 15/065 |
| 10,309,212 B2 * | 6/2019 | Schultheiss | C06B 47/14 |
| 2006/0102258 A1 * | 5/2006 | Taylor | C06B 23/006 149/45 |
| 2017/0226270 A1 | 8/2017 | Gozin et al. | |
| 2019/0092895 A1 | 3/2019 | Gozin et al. | |

FOREIGN PATENT DOCUMENTS

| | | | | |
|---|---|---|---|---|
| CN | 108840833 A | * | 11/2018 | ............. C06B 25/34 |
| CN | 110483556 A | * | 11/2019 | ............. C06B 21/00 |

OTHER PUBLICATIONS

P. Gaponik et al., 20 Chemistry of Heterocyclic Compounds, 1388-1391 (1984) (Year: 1984).*
CAS Abstract and Indexed Compound, Z. Li et al., CN 110483556 (2019) (Year: 2019).*
M. Huynh et al., 103 PNAS, 5409-5412 (2006) (Year: 2006).*

* cited by examiner

*Primary Examiner* — Alexander R Pagano
(74) *Attorney, Agent, or Firm* — Fredric J. Zimmerman

(57) ABSTRACT

A method for synthesizing an energetic compound via direct assembly. The energetic compound being characterized by a local structure that features four crystallographically unique copper atoms bound by nine unique azide molecules and one tetrazole molecule with potassium ions to form a salt.

4 Claims, 1 Drawing Sheet

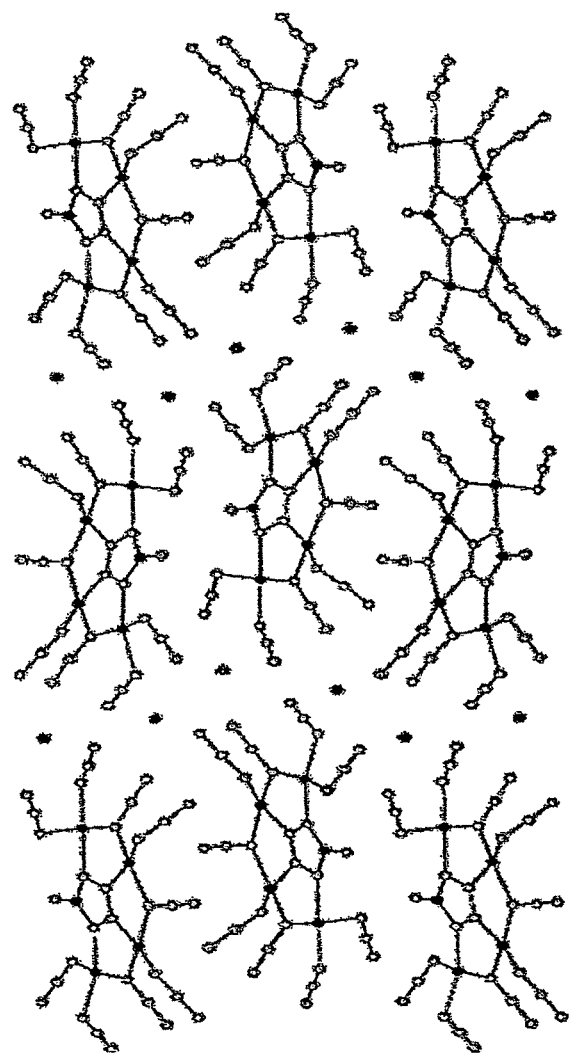
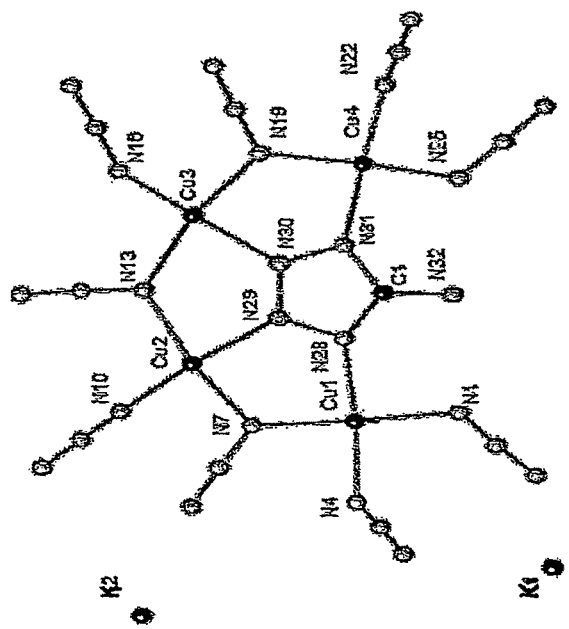
Figure 1(a)
Figure 1(b)

ously unknown energetic compound via direct assembly. The energetic compound is characterized by a local structure that features four crystallographically unique copper atoms bound by nine unique azide molecules and one tetrazole molecule in a crystalline salt.

BACKGROUND OF THE INVENTION

The classic solvothermal direct assembly syntheses of energetic materials are described extensively in the literature. The rationale for the present invention was to utilize solvothermal methods to generate conditions that would provide a novel energetic salt. In the present invention, the unique combination of tetrazole, azide and choice of solvent enables synthesis of stabilized azide moieties. This energetic salt may be utilized as a "green" primary and/or as a novel high-energy, high-nitrogen explosive ingredient in formulations.

SUMMARY OF THE INVENTION

An embodiment of the invention describes a method of making an energetic compound represented by Formula 1: $K_2Cu_4(CH_2N_5)(N_3)_9$. The method includes: combining 100 mg of copper nitrate hexahydrate, 5-aminotetrazole and sodium azide in a ratio of 1:1:2 in 2 ml of heated ethanol to allow self-assembly of the reagents; adjusting pH of the reagent mixture by adding 40 μL of 10 molar potassium hydroxide; sealing the reagent mixture in a 23 mL Teflon-lined Parr reaction vessel and statically heating the Parr reaction vessel at 90° C. for 24-48 hours in an oven; removing the Parr reaction vessel from the oven and allowing the Parr reaction vessel to cool to room temperature; decanting a mother liquor from the reagent mixture, to obtain reaction products including the energetic compound; and washing the reaction products with water and ethanol to obtain dark green/black crystals of the energetic compound.

Another exemplary embodiment of the invention describes an energetic compound represented by Formula 1: $K_2Cu_4(CH_2N_5)(N_3)_9$, the local structure of which consists of four crystallographically unique copper atoms (Cu1, Cu2, Cu3, Cu4) bound by nine unique azide molecules and one tetrazole molecule, wherein: Cu1 is bound by two unique azide molecules via N1 and N4, point shares one azide molecule with Cu2 via N7 and is bound to tetradentate tetrazole via N28, resulting in a square planar geometry; Cu2 is bound by one unique azide molecule via N10, point shares two azide molecules via N7 and N13 and is bound by the tetradentate tetrazole via N29, also resulting in a square planar geometry; Cu3 is bound by one unique azide molecule via N16, point shares two azide molecules via N13 and N19 and is further bound by the tetra dentate tetrazole via N30, further resulting in a square planar geometry; and Cu4 is bound by two unique azide molecules via N22 and N25, point shares one azide molecule via N19 and is bound by the tetradentate tetrazole via N31, yet further resulting in a square geometry.

BRIEF DESCRIPTION OF THE DRAWINGS

Various non-limiting embodiments are further described with reference to the accompanying drawings in which:

FIG. 1(a) illustrates four crystallographically unique copper atoms—Cu1, Cu2, Cu3, Cu4—bound by nine unique azide molecules and one tetrazole molecule, resulting in a local anionic fan-like structure that is charge-balanced by two potassium cations K1 and K2, according to an embodiment of the invention; and FIG. 1(b) illustrates the overall binding of the copper atoms by the azide and tetrazole molecules and the charge-balancing potassium cations forms a salt that packs pseudo-chains of the copper "fans" into an overall 3-D topology, according to an embodiment of the invention.

DETAILED DESCRIPTION OF THE INVENTION

The present invention relates to a method of making an energetic compound by direct assembly, to provide an energetic salt.

CAUTION: The materials described within this disclosure are energetic. As such, care should be taken in handling the compounds upon formulation and manipulation. A potential and dangerous side product, that may be formed, is Copper Azide. Appropriate PPE should be worn at all times, including goggles, conductive shoes and a flame-resistant lab coat.

Actual Synthesis of the Energetic Compound, $K_2Cu_4(CH_2N_5)(N_3)_9$

The energetic compound, $K_2Cu_4(CH_2N_5)(N_3)_9$, was synthesized by direct assembly of a tetrazole ligand, azide and copper nitrate hexahydrate (100 mg), 5-aminotetrazole and sodium azide in a ratio of 1:1:2 in 2 ml of ethanol heated under solvothermal conditions. The pH of the reaction was adjusted by addition of 40 μL of 10 molar potassium hydroxide. The reagents were sealed in a 23 ml Teflon-lined Parr reaction vessel and heated statically at 90° C. for 24-48 hours in an oven. Upon removal from the oven, the Parr reaction vessel was allowed to cool to room temperature and a mother liquor was decanted from the reaction products, consisting of dark green/black crystals of the energetic compound. The reaction products also contained sodium azide, as an impurity, which was washed away with water and ethanol. Hammer tests performed on the isolated dark green/black crystals gave positive results for energetic compounds in the form of a loud snap, light and the odor of burnt materials.

Structure of the Energetic Compound, $K_2Cu_4(CH_2N_5)(N_3)_9$

The energetic compound, $K_2Cu_4(CH_2N_5)(N_3)_9$, consists of four crystallographically unique copper atoms—Cu1, Cu2, Cu3, Cu4—bound by nine unique azide molecules and one tetrazole molecule, as shown in FIG. 2(a), wherein the local structure of the energetic compound labels the potassium, copper and binding nitrogen atoms, while the non-binding nitrogen atoms are left unlabeled for clarity. Cu1 is bound by two unique azide molecules via N1 and N4, point shares one azide molecule with Cu2 via N7 and is bound to tetradentate tetrazole via N28, resulting in a square planar geometry. Cu2 is bound by one unique azide molecule via N10, point shares two azide molecules via N7 and N13 and is bound by the tetradentate tetrazole via N29, resulting in a square planar geometry. Cu3 is bound by one unique azide molecule via N16, point shares two azide molecules via N13 and N19 and is further bound by the tetra dentate tetrazole via N30, resulting in a square planar geometry. Finally, Cu4 is bound by two unique azide molecules via N22 and N25, point shares one azide molecule via N19 and is further bound by the tetradentate tetrazole via N31, resulting in a square geometry. The overall binding of the copper atoms by the azide and tetrazole molecules results in an anionic fan-like structure, FIG. 2(a), that is charge balanced by the two potassium cations K1 and K2, yielding a salt. This salt packs in space, to form pseudo-chains of the copper "fans" that are held together via supramolecular interactions, which are charge-balanced by potassium cations, giving rise to the overall 3-D topology shown in FIG. 2(b).

The invention has been described with references to specific exemplary embodiments. While particular values, relationships, materials, and steps have been set forth for purposes of describing concepts of the invention, it will be appreciated by persons skilled in the art that numerous variations and/or modifications may be made to the invention as shown in the disclosed exemplary embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain embodiments and modifications of the concept underlying the present invention, various other embodiments as well as potential variations and modifications of the embodiments shown and described herein will obviously occur to those skilled in the art upon becoming familiar with such underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present embodiments are to be considered in all respects as illustrative and not restrictive.

The corresponding structures, materials, acts, and equivalents of all means or step plus function elements in the claims below are intended to include any structure, material, or act for performing the function in combination with other claimed elements as specifically claimed. The descriptions of the various embodiments herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A method of making an energetic compound represented by Formula 1, $K_2Cu_4(CH_2N_5)(N_3)_9$, the method comprising:
   combining 100 mg of copper nitrate hexahydrate, 5-aminotetrazole and sodium azide in a ratio of 1:1:2 in 2 ml of heated ethanol to allow self-assembly of reagents;
   adjusting pH of the reagents by adding 40 μL of 10 molar potassium hydroxide;
   sealing the reagents in a 23 mL Teflon-lined Parr reaction vessel and statically heating at 90° C. for 24-48 hours in an oven;
   removing the Parr reaction vessel from the oven and allowing the Parr reaction vessel to cool to room temperature;
   decanting a mother liquor to obtain reaction products including the energetic compound; and
   washing the reaction products with water and ethanol to obtain dark green/black crystals of the energetic compound.

2. An energetic compound, comprising:
   a local structure being represented by Formula 1: $K_2Cu_4(CH_2N_5)(N_3)_9$, wherein the local structure consists of four crystallographically unique copper atoms—Cu1, Cu2, Cu3, and Cu4—bound by nine unique azide molecules and one tetrazole molecule in Structure 1:

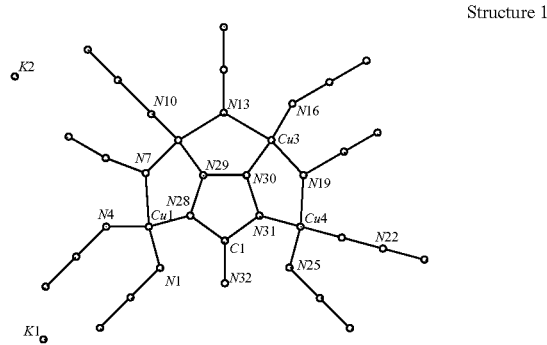

Structure 1 wherein:
   the Cu1 is bound by two unique azide molecules via N1 and N4, point shares one azide molecule with Cu2 via N7 and is bound to tetradentate tetrazole via N28, resulting in a square planar geometry,
   the Cu2 is bound by one unique azide molecule via N10, point shares two azide molecules via N7 and N13 and is bound by the tetradentate tetrazole via N29, also resulting in a square planar geometry,
   the Cu3 is bound by one unique azide molecule via N16, point shares two azide molecules via N13 and N19 and is further bound by the tetradentate tetrazole via N30, further resulting in a square planar geometry, and
   the Cu4 is bound by two unique azide molecules via N22 and N25, point shares one azide molecule via N19 and is bound by the tetradentate tetrazole via N31, yet further resulting in a square geometry.

3. The energetic compound of claim 2, wherein overall binding of the copper atoms by the azide and tetrazole molecules results in an anionic fan-like structure that is charge balanced by two potassium cations K1 and K2, yielding a salt.

4. The energetic compound of claim 3, wherein the salt packing packs in space, to form pseudo-chains of copper "fans" that are held together via supramolecular interactions, which are charge-balanced by the potassium cations, giving rise to an overall 3-D topology.

\* \* \* \* \*